United States Patent [19]

Kanbayashi

[11] Patent Number: 4,891,670

[45] Date of Patent: Jan. 2, 1990

[54] COPYING MACHINE IN WHICH COPYING MAGNIFICATION CAN BE EASILY SET

[75] Inventor: Hideyuki Kanbayashi, Osaka, Japan

[73] Assignee: Minolta Camera Kabushiki Kaisha, Osaka, Japan

[21] Appl. No.: 210,805

[22] Filed: Jun. 24, 1988

[30] Foreign Application Priority Data

Jun. 26, 1987 [JP] Japan ............................... 62-158863

[51] Int. Cl.[4] ...................... G03G 15/04; G03B 27/52

[52] U.S. Cl. ....................................... 355/243; 355/55

[58] Field of Search ............... 355/204, 206, 208, 243, 355/55, 61

[56] References Cited

FOREIGN PATENT DOCUMENTS 59-7381 1/1984 Japan ..................................... 355/55

60-113216 6/1985 Japan .

62-100778 5/1987 Japan .

*Primary Examiner*—A. T. Grimley

*Assistant Examiner*—Edward Pipala

*Attorney, Agent, or Firm*—Burns, Doane, Swecker & Mathis

[57] ABSTRACT

A copying machine in which copying magnification can be changed comprises a slide lever for selecting an arbitrary copying magnification and a CPU for calculating the copying magnification based on the amount of travel of the slide lever, wherein the CPU controls the copying machine such that the copying operation is carried out at desired prescribed magnification rates regardless of the set position of the slide lever in the equal scale magnification region and in prescribed magnification copying regions which are frequently used and that the copying operation is carried out at a magnification rate corresponding to the set position of the slide lever in particular magnification set regions other than the above described regions.

10 Claims, 4 Drawing Sheets

COPYING MACHINE IN WHICH COPYING MAGNIFICATION CAN BE EASILY SET

BACKGROUND OF THE INVENTION

1. Field of the Invention

The present invention relates generally to setting of magnification of a copying machine and, more specifically, to a portion for setting arbitrary copying magnification using a slide bar.

2. Description of the Prior Art

A magnification setting portion of a conventional copying machine is disclosed in, for example, Japanese Laid-Open Patent Application No. 113216/1985 entitled "Image Processing Apparatus". FIG. 1 shows an appearance of an operating portion of a conventional copying machine. The conventional operating portion comprises, for setting the magnification of the copying machine, a magnification rate displaying portion 34 for displaying the magnification rate, an equal scale magnification setting key 39, a prescribed scale magnification setting key 40, an equal scale magnification displaying portion 36, a prescribed scale magnification displaying portions 37*a* to 37*c*, a variable scale magnification setting lever 35 and a variable scale magnification copying mode display 38. Numerals 41 written on the upper portion of the variable scale magnification setting slide key show the graduation of the copying magnification. The magnification setting portion of a conventional copying machine comprises a number of levers and keys for setting variable scale magnification and prescribed scale magnification. Therefore, for a user, it is troublesome to select keys. For the copying machine, there is a problem that large area of the operation panel are occupied by keys for setting magnification. For example, in the above described prior art, the area of the magnification setting portion is about ⅓ of the total area of the operation panel.

Meanwhile, the prescribed scale magnification and variable scale magnification can be set merely by a slide bar in order to reduce the occupied area on the operation panel. In this case, however, the user must pay close attention in setting prescribed scale magnification. If the position of the slide bar is shifted a little, the magnification rate changes.

SUMMARY OF THE INVENTION

Therefore, one object of the present invention is to provide a copying machine in which the magnification rate can be easily set.

Another object of the present invention is to provide a copying machine in which a user can set arbitrary magnification easily.

A further object of the present invention is to provide a copying machine in which the range of the set copying magnification can be easily changed.

A still further object of the present invention is to provide a copying machine in which the area occupied by the magnification setting portion is small relative to the total area of the operation panel.

A still further object of the present invention is to provide a copying machine in which arbitrary scale magnification but also various prescribed scale magnification can be easily set merely by a slide bar.

The above described objects of the present invention can be attained by a copying machine, comprising: a shiftable member manually movable in a prescribed direction for setting copying magnification; means for detecting the amount of travel of the shiftable member; magnification setting means for setting magnification to be copied in response to a detected output of the travel amount detecting means; fixed scale holding means coupled to the magnification setting means for holding the said magnification at a fixed scale regardless of the amount of travel in a prescribed range of the amount of travel; and set magnification display means for displaying the set magnification.

Since the copying machine comprises the above described copying magnification setting means, there will be two regions, that is, a region in which the copying magnification is set depending on the travel amount of the shiftable member, and a region in which the copying magnification is not set. Therefore, the above regions can be separately used according to the copying magnification. Consequently, a copying machine can be provided in which the magnification can be easily set.

According to a preferred embodiment, the fixed-scale magnification holding means comprises transfer function determining means for determining transfer function which defines the copying magnification in response to the output detected by the travel amount detecting means. Therefore, the copying magnification can be set by the transfer function. The arbitrary scale magnification can be set dependent on the content of the transfer function. Consequently, a copying machine can be provided in which the magnification setting region and/or range can be easily changed.

According to a more preferred embodiment of the present invention, a prescribed range comprises a copying magnification which is used frequently. Therefore, when copies should be taken at a magnification scale which is frequently used, the operator do not need to pay close attention to the stopping position of the shiftable member. Consequently, a copying machine can be provided in which the magnification can be easily set by an operator.

According to a more preferred embodiment of the present invention, the prescribed range comprises a plurality of ranges, the plurality of ranges comprising an equal scale magnification, and in the magnification setting means, the magnification can be changed in proportion to the amount of travel of the shiftable member in ranges other than the prescribed range.

Since the copying machine comprises the above described copying magnification setting means, the user do not necessary pay close attention to the stopping position of the shiftable member when a frequently used prescribed magnification is set. The user should pay close attention to the stopping position of the shiftable member only when a particular magnification is set. Therefore, a copying machine can be provided in which the arbitrary scale magnification and the prescribed scale magnification can be easily set merely by a shiftable member.

In addition, since the magnification can be set merely by the shiftable member, the area occupied by the magnification setting portion can be made small. Consequently, a copying machine can be provided in which the area occupied by the magnification setting portion is small relative to the total area of the operation panel.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
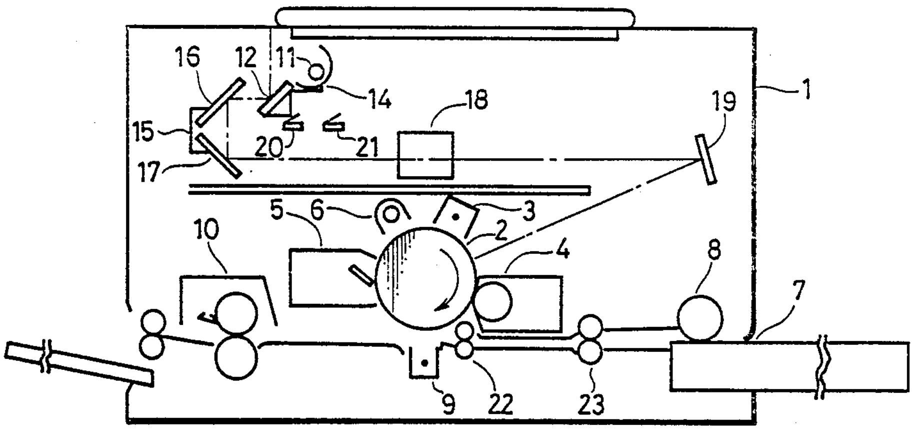
FIG. 2 is a schematic cross sectional view showing one example of a copying machine to which the present invention is applied.

FIG. 2 is a schematic cross sectional view of a copying machine to which the present invention is applied. The copying machine 1 comprises an optical system for forming images of an original on a photoreceptor drum 2, a photoreceptor drum 2 on which an electrostatic latent image of the original is formed, paper feeding portions 7 and 8 for feeding copy papers on which the electrostatic latent images are copied, and a fixing apparatus 10 for fixing copied images on the copy paper.

Around the photoreceptor drum 2 arranged are a corona charger 3 for forming electrostatic latent images on the photoreceptor drum 2, a developer 4, a transfer charger 9, a cleaner apparatus 5, and a eraser 6. The optical system comprises a scanning unit 14, second and third movable mirrors 16 and 17 held in a common holder 15, a lens 18 and a fixed mirror 19. The scanning unit 14 comprises a light source 11 of slit exposure type and a first movable mirror 12.

The surface of the photoreceptor drum 2 is charged by the corona charger 3 to have positive polarity. The light source 12 is turned on. The scanning unit 14 is moved to the right in the figure by a scanning motor, not shown, whereby an electrostatic latent image corresponding to the image of the original is formed.

The moving velocity V of the scanning unit 14 is set at $V=V_O/m$, where the peripheral velocity of the photoreceptor drum 2 is on $V_O$ and the copying magnification is m. In scanning, the second and third movable mirrors 16 and 17 are moved to the right in the figure at the speed of $V_O/2$ m.

The scanning unit 14 presses a prescribed position switch 20 in the normal state, that is, when the unit is not scanning, so as to generate a prescribed position signal to a CPU 25 which will be described later (the signal becomes "1" when the scanning unit 14 is at the prescribed position). The scanning unit 14 presses a timing switch 21 when it is moved to left by a prescribed distance after the start of scanning so that the unit operates in synchronization with the paper feeding system. At that time, a timing signal which becomes "1" when the unit 14 presses the timing switch 21) which is a reference for operating a timing roller 22 which will be described later is sent to the said CPU 25.

In the above described copying machine, when the magnification should be changed, the velocity of the scanning system is set corresponding to the magnification and the lens 18 is moved to a prescribed position corresponding to the magnification.

A toner charged to have negative polarity which is supplied from the developer 4 is deposited on the surface of the photoreceptor drum. The above described electrostatic latent image is developed by this toner to form a toner image corresponding to the image of the original.

Thereafter, the toner image is transferred by the transfer charger 9 onto a copy paper (not shown) supplied from the timing roller 22 to the surface of the photoreceptor drum 2 with reference to the above described timing signal. The copy paper on which the toner image is transferred is fed to a fixing apparatus 10, the image is heat fixed therein and the paper is discharged.

The remaining toner on the surface of the photoreceptor drum 2 is removed by the cleaner apparatus 5 and withdrawn in the cleaner apparatus 5. The remaining charges on the surface of the photoreceptor drum 2 are removed by a main eraser 6 which is always turned on while the main motor is driven. The copy papers are fed by a paper feeding roller from a paper feeding cassette 7 at a prescribed timing, and is fed through an intermediate roller 23 to the timing roller 22.

Figure 3:
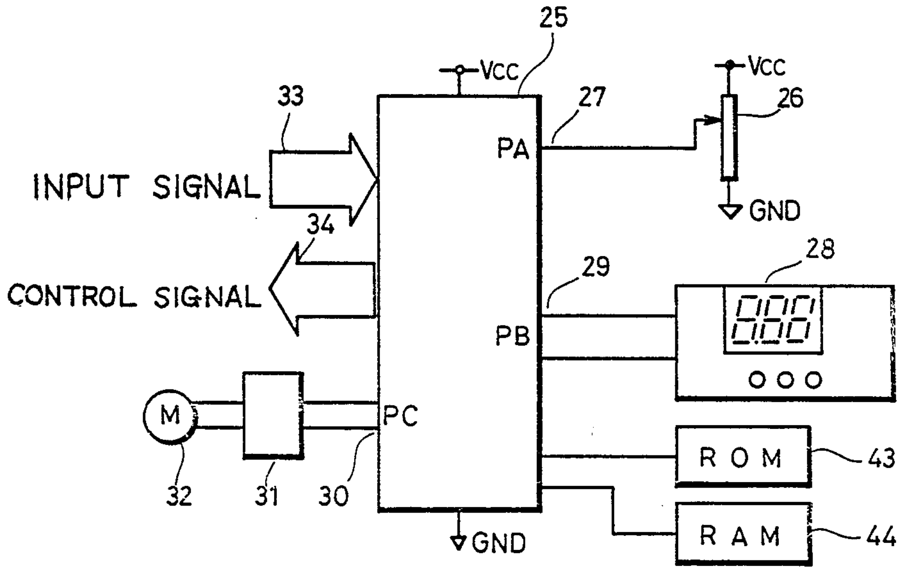
FIG. 3 is a schematic diagram of a control circuit of the copying machine shown in FIG. 2.

FIG. 3 is a schematic diagram of a control circuit of the copying machine shown in FIG. 2. The control circuit of the copying machine in accordance with the present invention comprises a microcomputer for controlling the copying machine 1. The microcomputer comprises a CPU 25, a ROM 43 connected to the CPU for storing operating procedure and the like of the copying machine, and a RAM 44 for storing data for operation. The CPU 25 comprises an input port for inputting input signals 33 and the like for operating the copying machine and an output port for outputting output signals and the like for operating the copying machine.

The CPU 25 checks the operating state of the machine by various input signals 33 and outputs control signals 34 for carrying out a prescribed copying operation.

The setting of the copying magnification is carried out by operating a slide bar which cooperates with a variable resistor 26. More specifically, when an operator operates the variable resistance, the amount of operation is converted into a voltage value to be inputted to an analog input port PA 27 of the CPU 25.

The voltage value inputted to the port PA 27 is converted into a digital value corresponding to the analog value by an A/D conversion which is not shown. Assuming that the resolution of the A/D conversion is 8 bit, the voltage value in the range of αv to Vccv will be divided into 256 steps.

Next, a first embodiment of the present invention will be described. A transfer function equation for finding the magnification y using the A/D converted digital value as a variable x will be defined as follows. Arithmetic operations are carried out by the CPU 25 to find the magnification rate y corresponding to the variable x.

Figure 4:
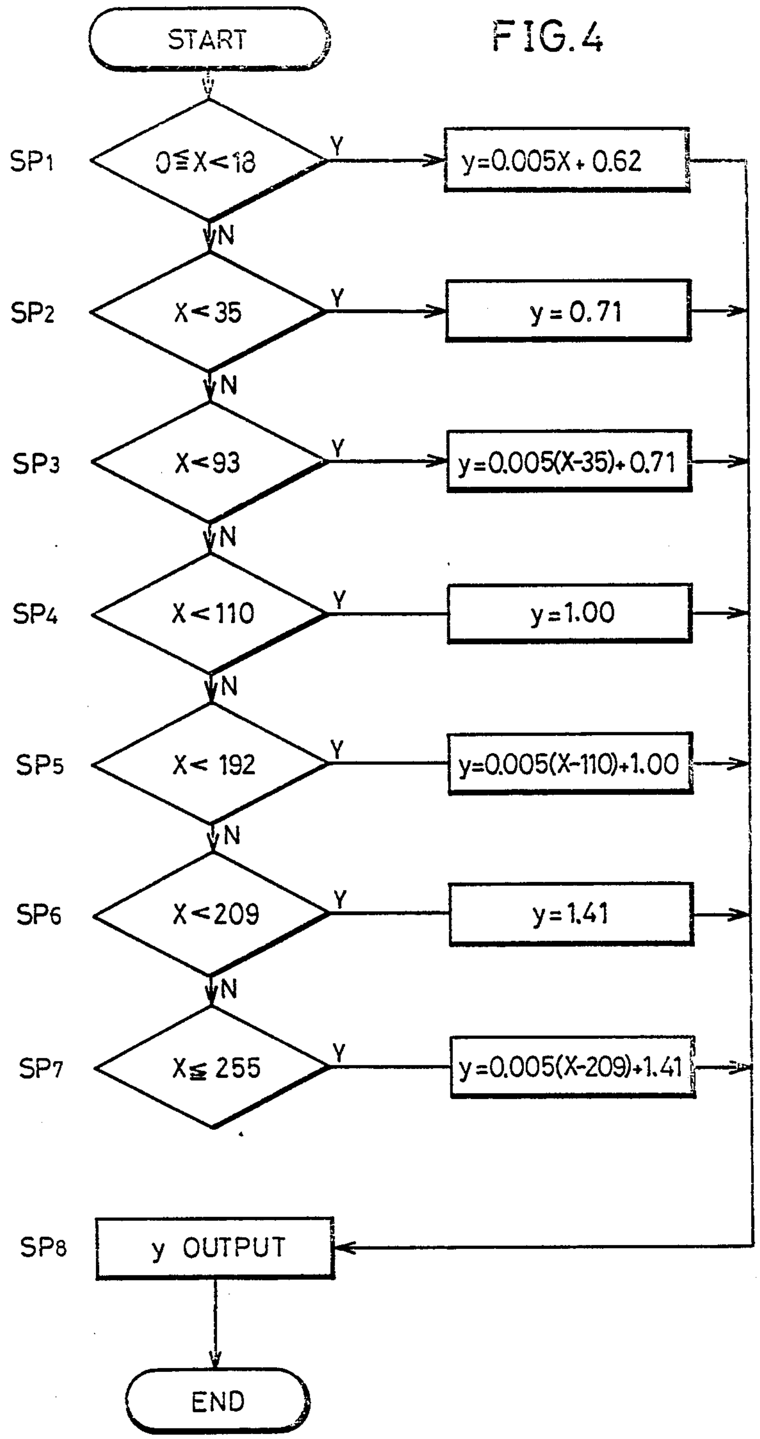
FIG. 4 shows a process of determining transfer function in accordance with one embodiment of the present invention.

Referring to FIG. 4, the procedure to find the transfer function will be described. In the step SP1, when the variable x is in the range of $0 \leqq x < 18$, the magnification will be $y=0.005x+0.62$. In the step SP2, when the valuable x is in the range of $18 \leqq x < 35$, the magnification will be $y=0.71$. Although the domain of variability of x is as wide as 17, the magnification can be set at a fixed value. The reason for this is that the magnification rate in this range comes under the magnification of reduction which is frequently used. In the step SP3, if x is in the range of $35 \leqq x < 93$, the magnification will be represented as $y = 0.005(x-35)+0.71$. In the step SP4, if the range of x is $93 \leqq x < 110$, the magnification y will be $y = 1.00$. Although the domain of variability of x is as wide as 17, the magnification is set at the equal rate, because the equal-scale copying magnification is frequently used. In the step SP5, if the range of x is $110 \leqq x < 192$, the magnification rate will be $y = 0.005(x-110)+1.00$. In the step SP6, if the range of x is $192 \leqq x < 209$, the magnification rate y is set at 1.41. Although the domain of variability of x is as wide as 17, the magnification is set at a fixed value. It is because the magnification rate 1.41 is frequently used as a fixed magnification rate for expansion. In the step SP7, if x is in the range of $209 \leqq x \leqq 255$, the magnification will be $y = 0.005(x-209)+1.41$. The magnification rate y obtained through the above described respective steps is outputted from the CPU 25 as a magnification in the step SP8.

Figure 5:
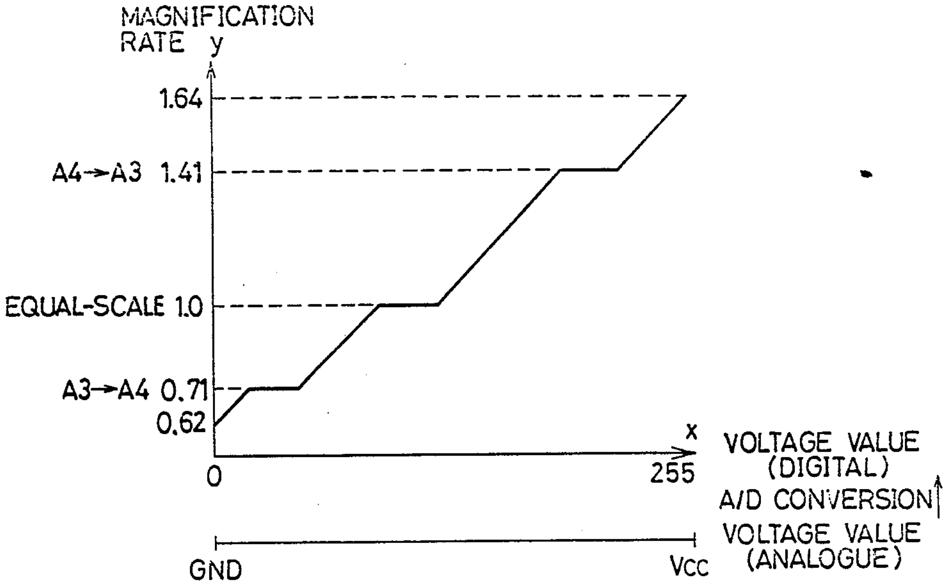
FIG. 5 is a graph showing the relation between the voltage for setting the copying magnification and the magnification.

The transfer function showing the relation between x and y is shown in FIG. 5.

In the first embodiment, the reference value defining the domain of variability of the variable x is stored in the RAM 44. The program of the transfer function for finding the magnification y based on the variable x is stored in the ROM 43. The CPU 25 accesses the RAM 44 to refer to the variable x and calculates the transfer function based on the value to find the magnification y. By holding the reference value in the RAM 44, the variable can be freely changed.

The copying magnification y is outputted from the output port PB 29 based on the above described variable x and is displayed on the magnification displaying portion 28. At the same time, a signal corresponding to the copying magnification is sent based on the above described variable x to a driver portion 31 which drives the scanning motor 32. Consequently, in accordance with the copying operation, the scanning motor is rotated at a constant speed in a prescribed timing, and the scanning unit 14 and the second and third movable mirrors 16 and 17 are moved.

A second embodiment of the present invention will be described in the following. In the second embodiment, the result of operation itself of the transfer function shown in FIG. 5 for setting the magnification is stored in the RAM 44. In the second embodiment, the CPU 25 refers to the content of the RAM 44 by an address based on the variable x to output the magnification y.

Figure 6:
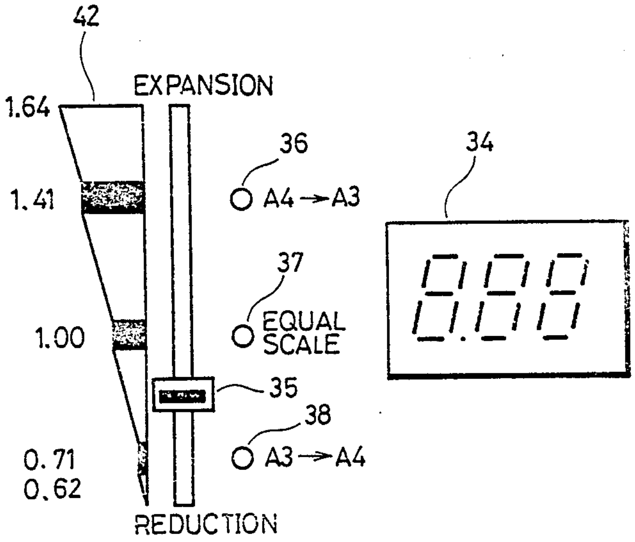
FIG. 6 shows a magnification setting portion in accordance with the present invention.

FIG. 6 is a plan view of an operation panel having a magnification setting portion employing the present invention.

Referring to FIG. 6, the copying magnification setting portion in accordance with the present invention comprises a slide bar 35 for selecting arbitrary rate of expansion and reduction, a gauge 42 for displaying the copying magnification corresponding to the range of sliding, a magnification rate displaying portion 34 for displaying the set copying magnification, and prescribed magnification displaying portions 36, 37 and 38. The range of travel of the slide bar corresponding to the prescribed magnifications such as the equal-scale magnification which is frequently used is wide relative to the whole region of the et copying magnification. Therefore, in setting the copying magnification which is frequently used, the user need not pay very close attention to the stopping position of the slide bar. The user should pay attention only when the slide bar is set at an arbitrary set value selected by the user. Therefore, in this copying machine provided with the copying magnification setting portion of the present invention, the prescribed magnification can be easily set by using the slide bar. Consequently, a copying machine can be provided in which the setting of copying magnification can be easily carried out. Especially, the user need not pay very close attention to the stopping position of the slide bar in setting a magnification which is frequently used. A large number of keys in a conventional copying magnification setting portion which confuses an user to select can be dispensed. Therefore, a copying machine can be provided in which the user can set the arbitrary magnification easily.

Figure 1:
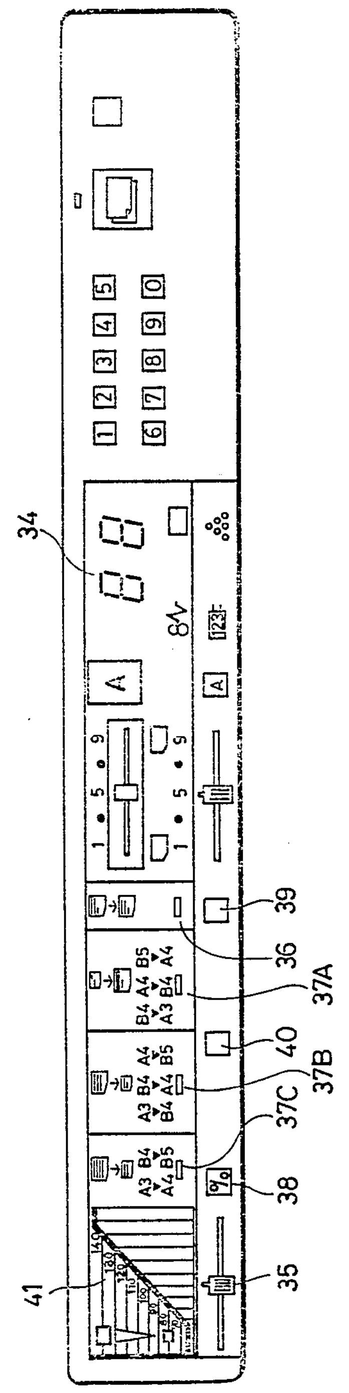
FIG.1 PRIOR ART
FIG. 1 shows a magnification setting portion of a conventional copying machine.

According to the present invention, not only arbitrary magnification but also prescribed magnifications can be easily set simply by the operation of the magnification setting lever compared with the magnification setting portion of the prior art shown in FIG. 1, the equal-scale magnification and prescribed magnification setting keys 39 and 40 are eliminated. Accordingly, the display at the magnification setting portion is made simple. Therefore, the proportion of the area occupied by the magnification setting portion to the total area of the operation panel can be reduced.

In the above described embodiment, the magnification y is obtained from the input voltage x by software application using the CPU 25, ROM 43 and the RAM 44. Alternately, a slide resistor with a resistance value having the characteristics of the transfer function may be used to obtain the same effect. This embodiment can be implemented by, for example, using a common variable resistor with a conductive paint applied on regions where the prescribed magnification remains as it is.

In the above embodiment, the resistance value of the variable resistor 26 is changed by using a parallel moving slide bar. Alternately, a rotatable knob may be used to change the resistance value.

As described above, according to the present invention, the structure of the magnification setting portion can be made simple since the setting of magnification is carried out only by the slide lever. Consequently, the area occupied by the magnification setting portion on the operation panel can be reduced.

The relation between the amount of travel of the lever and the magnification is obtained by an operation of the CPU or it is stored in a memory appended to the CPU. Therefore, the relation between the amount of travel and the magnification can be arbitrary changed after it is set.

In the range of travel of the slide lever provided are regions in which the magnification changes corresponding to the amount of travel of the lever and regions in which the magnification is set at a fixed rate irrespective of the amount of travel of the lever, corresponding to the stop position of the slide lever. Therefore, the regions may be selected corresponding to the copying magnification. Thus, a copying machine can be provided in which the magnification can be set easily.

Since the region in which the magnification is set at a fixed rate irrespective of the amount of travel of the lever corresponds to the region of prescribed magnification which is frequently used, the setting of the slide lever to the prescribed magnification can be carried out easily. Therefore, the copying magnification can be easily set by the user.

Although the present invention has been described and illustrated in detail, it is clearly understood that the same is by way of illustration and example only and is not to be taken by way of limitation, the scope of the present invention being limited only by the terms of the appended claims.

What is claimed is:

1. A copying machine in which copying magnification can be easily changed, comprising:

a shiftable member manually movable in a prescribed direction for setting copying magnification;

travel amount detecting mans for detecting the amount of travel of said shiftable member;

magnification setting means responsive to an output detected by said travel amount detecting means for setting magnification to be copied;

fixed magnification holding means coupled to said magnification setting means for holding said set magnification at a fixed value irrespective of said amount of travel in a prescribed range of said amount of travel; and set magnification displaying means for displaying said set magnification.

2. A copying machine in which copying magnification can be changed according to claim 1, wherein said fixed magnification holding means comprises a transfer function determining means responsive to an output detected by said travel amount detecting means for determining copying magnification.

3. A copying machine in which copying magnification can be changed according to claim 2, wherein said transfer function determining means comprises transfer function storing means for storing said transfer function, and transfer function reading means for reading said transfer function from said transfer function storing means.

4. A copying machine in which copying magnification can be changed according to claim 2, wherein said transfer function determining means comprises transfer function calculating means for finding said transfer function by calculation.

5. A copying machine in which copying magnification can be changed according to claim 2, wherein said travel amount detecting means comprises a variable resistance, and a resistance value of said variable resistance coincides with said transfer function.

6. A copying machine in which copying magnification can be changed according to claim 2, wherein said prescribed range comprises a copying magnification which is frequently used.

7. A copying machine in which copying magnification can be changed according to claim 6, wherein said prescribed range comprises a plurality of ranges and said plurality of ranges comprise an equal scale copying magnification.

8. A copying machine in which copying magnification can be changed according to claim 2, wherein said shiftable member comprises a slide bar.

9. A copying machine in which copying magnification can be changed according to claim 2, wherein said magnification setting means, the magnification is changed in proportion to the amount of travel of said shiftable member in ranges other than said prescribed range.

10. A copying machine in which copying magnification can be changed according to claim 2, wherein said travel amount detecting means comprises a variable resistance, and, said variable resistance converts the amount of travel of said shiftable member to a voltage value to be outputted.

* * * * *